(12) United States Patent
Axelsson et al.

(10) Patent No.: US 8,707,657 B2
(45) Date of Patent: Apr. 29, 2014

(54) PROCEEDING AND MEANS TO FASTEN MOUNTING ELEMENT INTO A WALL

(75) Inventors: Magnus Axelsson, Mölndal (SE); Martin Hiller, Jonsered (SE)

(73) Assignee: Aktiebolaget Hicet, Jonsered (SE)

( * ) Notice: Subject to any disclaimer, the term of this patent is extended or adjusted under 35 U.S.C. 154(b) by 0 days.

(21) Appl. No.: 13/518,114

(22) PCT Filed: Dec. 17, 2010

(86) PCT No.: PCT/SE2010/051409
§ 371 (c)(1),
(2), (4) Date: Jun. 21, 2012

(87) PCT Pub. No.: WO2011/078766
PCT Pub. Date: Jun. 30, 2011

(65) Prior Publication Data
US 2012/0279151 A1    Nov. 8, 2012

(30) Foreign Application Priority Data
Dec. 21, 2009 (SE) .................... 0950996

(51) Int. Cl.
*F16B 13/04* (2006.01)
*F16B 19/00* (2006.01)
*E04B 1/00* (2006.01)

(52) U.S. Cl.
USPC ......... 52/745.21; 52/704; 52/718.01; 411/30; 411/39; 411/45; 411/55; 411/432; 411/528

(58) Field of Classification Search
USPC ............... 411/34–38, 61, 432, 437, 528, 901, 411/908, 999, 969, 21, 29–31, 55, 42–43, 411/45–48, 340, 344–345; 52/741.4, 52/745.21, 745.19, 716.1, 741.1, 716.7, 52/718.01, 718.04, 718.06, 718.03, 52/717.04, 704–711; 470/27, 29–31
See application file for complete search history.

(56) References Cited

U.S. PATENT DOCUMENTS 2,018,251 A * 10/1935 Croessant .................... 411/37
2,030,170 A * 2/1936 Huck ............................ 411/38
2,040,939 A * 5/1936 Huck ............................ 470/29

(Continued)

FOREIGN PATENT DOCUMENTS

WO    86/03244 A1    6/1986

OTHER PUBLICATIONS

Sweden Patent Office, Int'l Search Report in PCT/SE2010/051409, Mar. 30, 2011.

*Primary Examiner* — Jeanette E. Chapman
(74) *Attorney, Agent, or Firm* — Piedmont Intellectual Property

(57) ABSTRACT

The present invention relates to both a proceeding and means for, in connection with hole making in a wall (1), for the mounting of items on the moisture-proof walls (1) of a wet area by means of an expandable mounting element (2), providing sealing of the hole. According to the invention, in addition to an expansion (I) of the mounting element (2) behind said wall (1), there is also provided an internal expansion (II) of the mounting element (2) in the receiving hole (3) of the mounting element (2) in question in the wall (1). There is furthermore provided a liquid-proof cover (III) around the entire mounting element (2) in question introduced and expanding in said receiving hole (3).

6 Claims, 14 Drawing Sheets

(56) References Cited

U.S. PATENT DOCUMENTS

Figure 6:
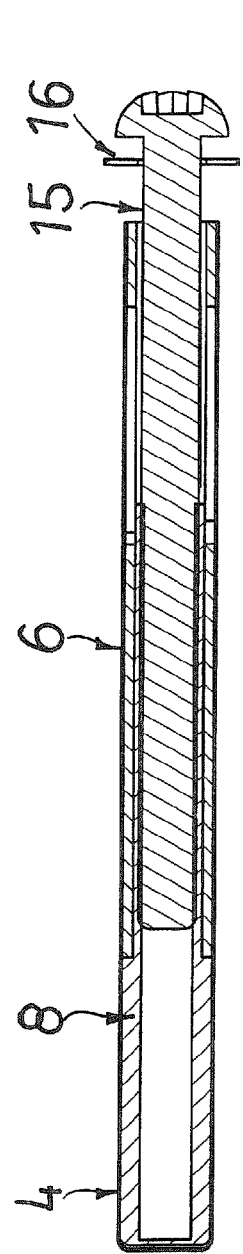

| | | | |
|---|---|---|---|
| 2,409,352 A * | 10/1946 | Gill | 411/38 |
| 3,348,444 A * | 10/1967 | Brignola | 411/38 |
| 4,197,781 A * | 4/1980 | Giannuzzi | 411/341 |
| 4,269,106 A * | 5/1981 | Leibhard et al. | 411/34 |
| 4,309,136 A * | 1/1982 | Talan | 411/36 |
| 4,312,612 A * | 1/1982 | Thompson | 411/15 |
| 4,642,009 A * | 2/1987 | Fischer | 411/38 |
| 4,647,264 A * | 3/1987 | Pamer et al. | 411/338 |
| 4,815,906 A * | 3/1989 | Binns | 411/38 |
| 4,875,815 A * | 10/1989 | Phillips, II | 411/38 |
| 5,205,688 A * | 4/1993 | Sundstrom | 411/38 |
| 5,380,135 A * | 1/1995 | Anquetin | 411/38 |
| 5,690,454 A * | 11/1997 | Smith | 411/30 |
| 5,725,341 A * | 3/1998 | Hofmeister | 411/32 |
| 6,309,155 B1 * | 10/2001 | Huang | 411/61 |
| 6,602,034 B2 * | 8/2003 | Wakai et al. | 411/37 |
| 6,609,866 B2 * | 8/2003 | Huang et al. | 411/34 |
| 6,746,191 B2 * | 6/2004 | Edland | 411/34 |
| 7,303,366 B2 * | 12/2007 | Smith | 411/43 |
| 7,520,708 B2 * | 4/2009 | Ciulis et al. | 411/34 |
| 7,621,950 B1 * | 11/2009 | Globerman et al. | 623/17.11 |
| 7,789,605 B2 * | 9/2010 | Kidman | 411/34 |
| 8,529,177 B2 * | 9/2013 | Toosky et al. | 411/43 |
| 2003/0053881 A1 | 3/2003 | Huang et al. | |
| 2007/0166122 A1 * | 7/2007 | McDuff et al. | 411/31 |
| 2008/0038078 A1 * | 2/2008 | Ciulis et al. | 411/34 |
| 2012/0257944 A1 * | 10/2012 | McDuff et al. | 411/21 |
| 2012/0311947 A1 * | 12/2012 | Van Wissen | 52/250 |

* cited by examiner

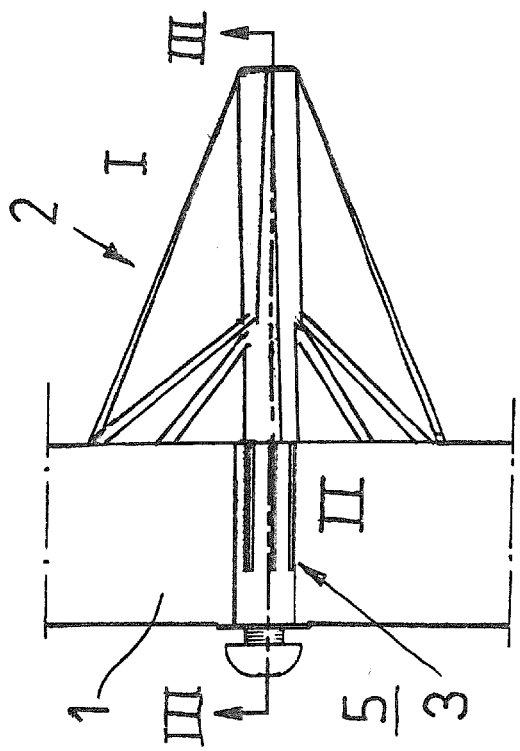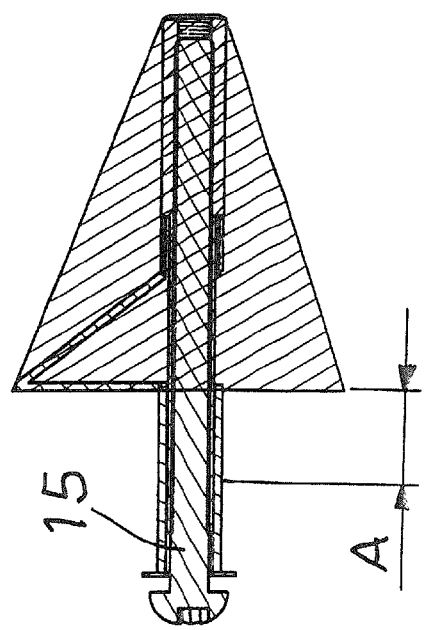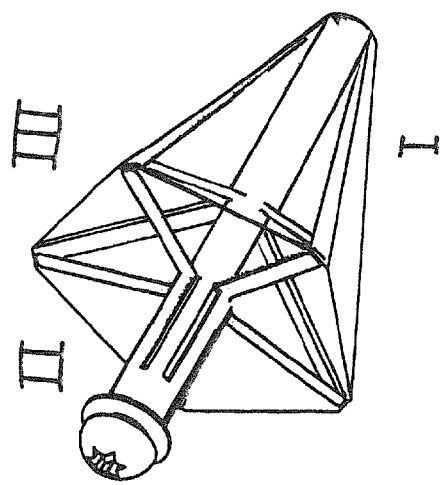

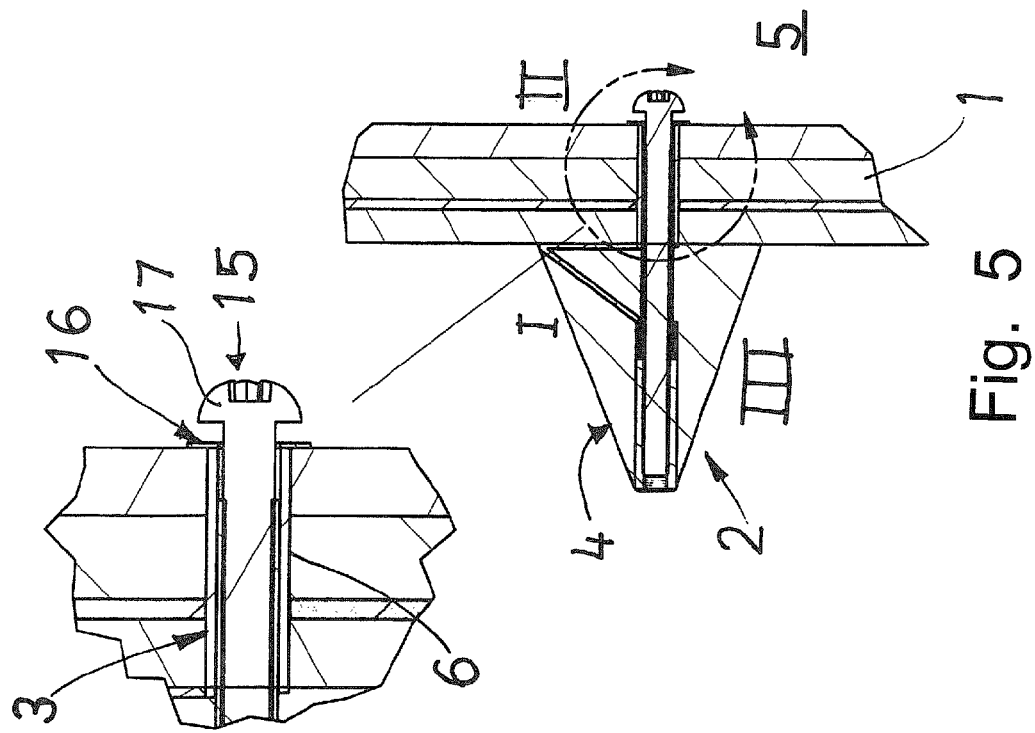
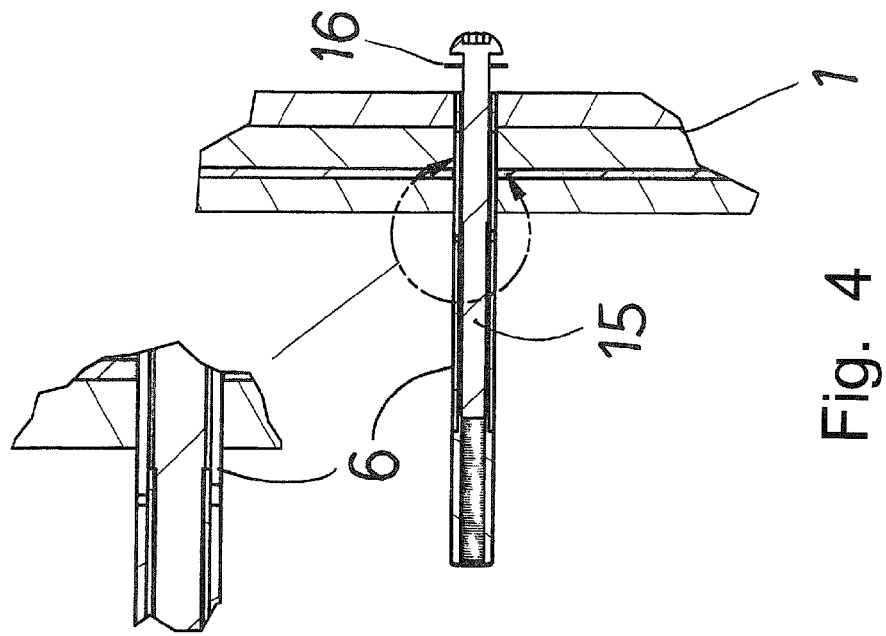

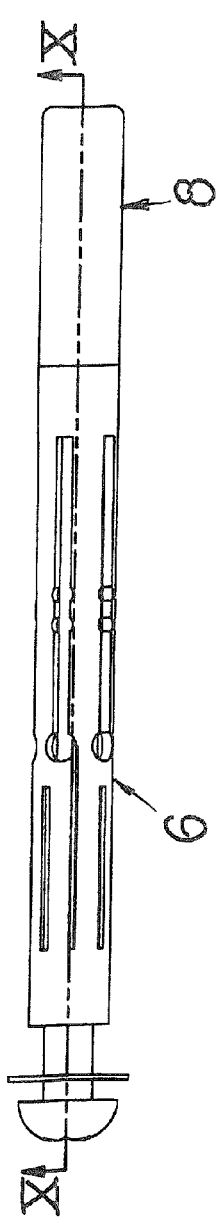
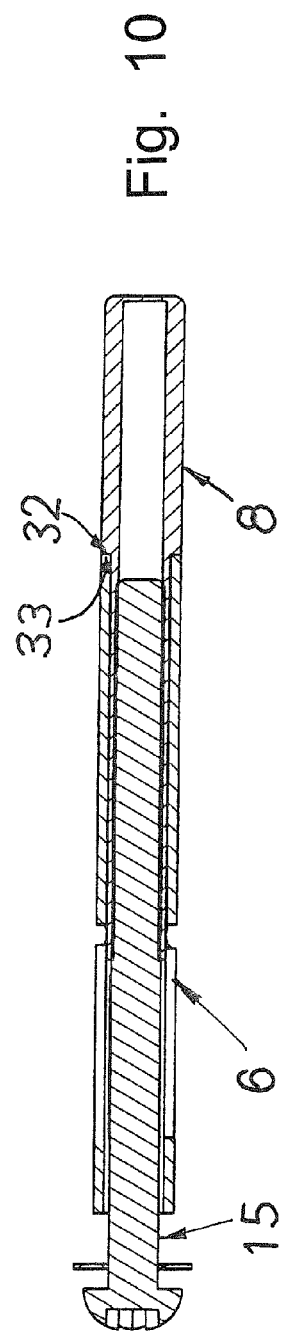
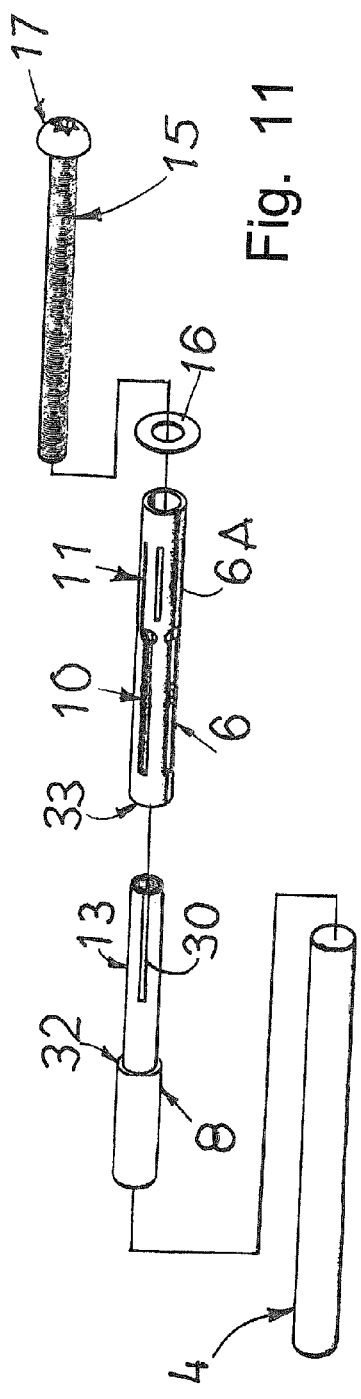
Fig. 9
Fig. 10
Fig. 11

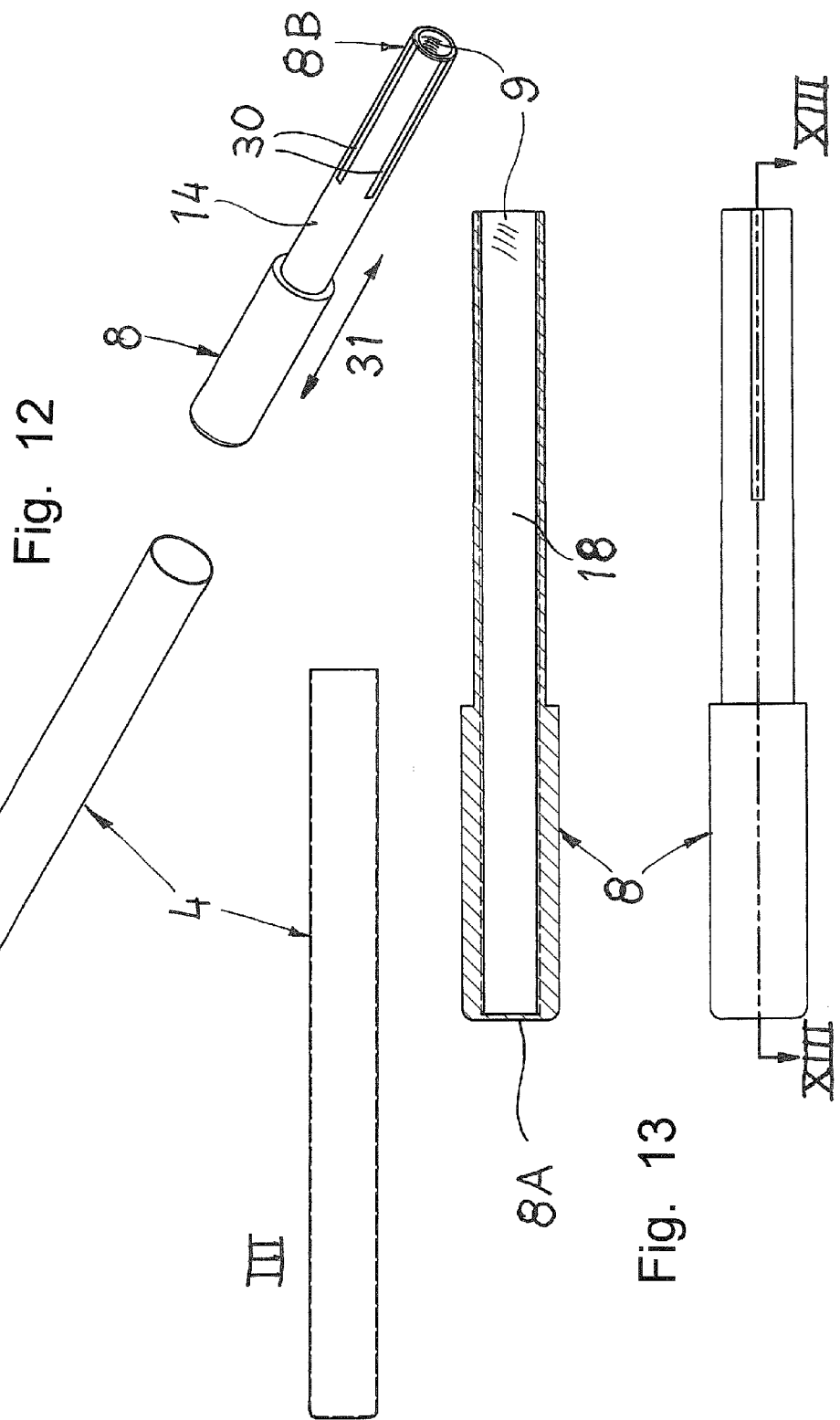

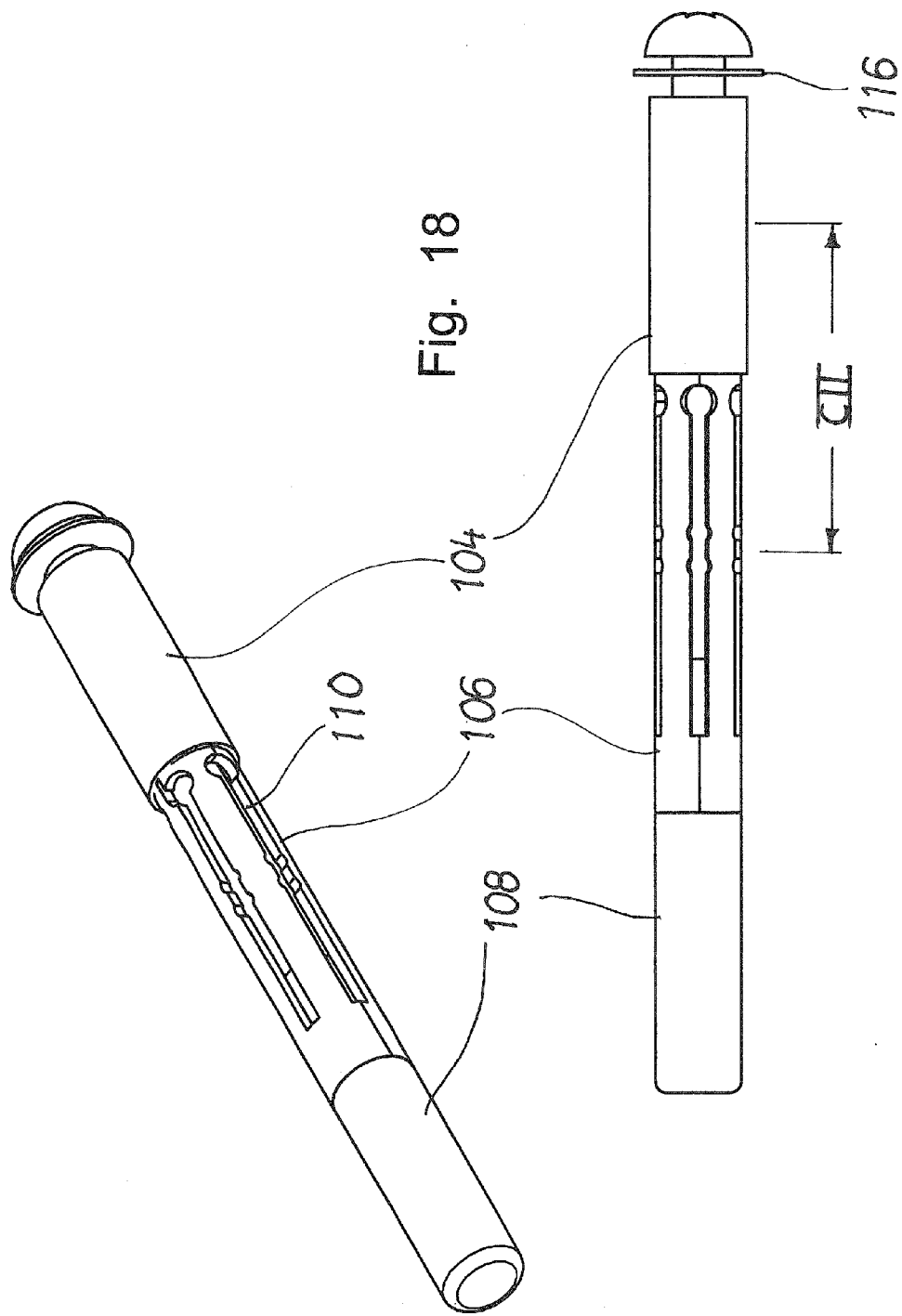

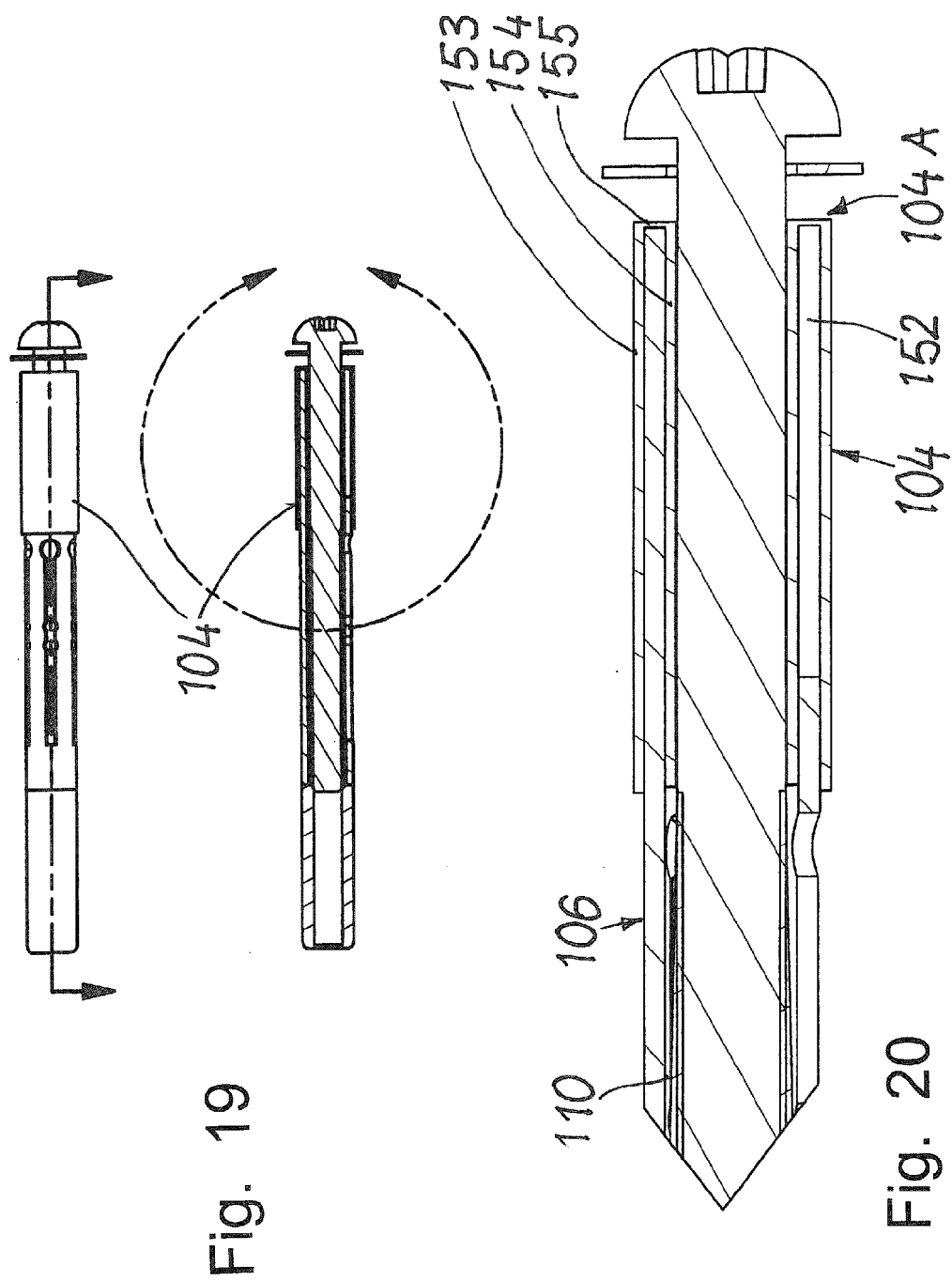

PROCEEDING AND MEANS TO FASTEN MOUNTING ELEMENT INTO A WALL

The present invention relates to a proceeding for, in connection with hole making in a wall, for the mounting of items on the moisture-proof walls of a wet area by means of an expandable mounting element, providing sealing of the hole.

The requirements and desire to moisture-proof bathrooms and other wet areas have successively augmented during the years. The insurance industry together with different professional and industrial organizations work continuously with disseminating information about how water damage can be prevented. In spite of this, water damage in bathrooms is still a significant problem, and only in Sweden, it corresponds to a cost of approx. SEK 39 million per week.

Among private persons, the striving to prevent damage has increased as the understanding that the damage may become both expensive and trying has become more apparent. The attitude among private persons in combination with the interest of the insurance companies make that today there is a market for new, more reliable and simpler solutions that can provide for this need.

The reliability in a bathroom relies upon its waterproof layer. Any mounting that destroys this waterproof layer requires an accurate repair. Instructions for attachment upon mounting vary depending on what and where to be mounted. Moreover, the workmanship varies depending on craftsman, occupational group or private person.

The development of a standardized attachment device that is impossible to vary and that is applicable to all mounting steps would therefore be desirable in order to guarantee that the waterproof layer always becomes correctly restored independently of the fitter or manufacturer.

Known examples of anchoring means for other attachment items are shown in, among others, DE 3,931,683 A1, which discloses an anchor bolt (12) having an expansion sleeve (10), DE 4,106,507 A1, which discloses a mounting bolt (2) for vehicles and also provided with an expandable sleeve (7), and CA 2,270,570 A, which discloses a bolt (10) having an expandable sleeve (12) situated far out on the threads (18) of the bolt.

All attachments in the wet zone of the wet area should be made in solid structure, e.g., in concrete, in joists, or in a nogging piece. An attachment must not be made solely in a wallboard. This means that when concrete walls are lacking, the position of all fittings has to be predetermined before wet area boards are to be mounted.

At each planned attachment, a postjacent nogging piece is mounted if a joist is lacking. A disadvantage of not being able to make a planned attachment, without a postjacent solid structure, is that the exact position of fittings may be difficult to foresee as well as that a desire to complete with new things may arise sometime later on.

Another disadvantage is that, in connection with the framing of the bathroom, a nogging piece, for instance, may also be missed to be mounted. There is no possibility of putting right a missing nogging piece without needing to dismount a wall in question into its stud work. Attachments using a traditional expander can be made without a solid structure but cannot be applied in wet rooms because of the waterproof layer of the wet room being damaged and thereby losing its sealing capacity.

None of these known solutions provides a liquid-proof fixing. Usually, silicone® is utilized for securing holes against moisture, but not even this gives a reliable sealing, particularly not when screws have been removed from items that previously have been mounted in and on, respectively, the wall.

Therefore, the main object of the present invention is primarily the development of a system and a wet area expander that are applicable to the walls of wet areas and to mounting steps therefor, and that allow a mounting without a postjacent solid structure without destroying the function of the waterproof layer of the wet room.

Said object is achieved by means of a proceeding according to the invention that essentially is characterized in that, in addition to providing an expansion of the mounting element behind said wall, there is also provided an internal expansion of the mounting element in the receiving hole of the mounting element in question in the wall, as well as there is furthermore provided a liquid-proof cover around the entire mounting element in question introduced and expanding in said receiving hole, and by means of means according to the invention, respectively, that essentially is characterized in that an expansion sleeve has the ability to expand at a distance from each other, as seen along the length extension of the sleeve, that said expansion is arranged to occur externally further in on the sleeve and internally further out on the sleeve, as well as that an expandable, preferably elastic liquid-proof cover surrounds said sleeve from the outer portion thereof.

The invention is also comprised of an additional proceeding that is characterized in that, in addition to providing an expansion of the mounting element behind said wall, there is also provided an internal expansion of the mounting element in the receiving hole of the mounting element in question in the wall, as well as there is furthermore provided a liquid-proofing around the mounting element in question introduced and expanding in said receiving hole.

The invention is also comprised of an additional means for carrying out a proceeding for, in connection with hole making in a wall, for the mounting of items on the moisture-proof walls of a wet area by means of an expandable mounting element, providing sealing of the hole.

A said means is characterized in that an expansion sleeve has the ability to expand at a distance from each other, as seen along the length extension of the sleeve, that said expansion is arranged to occur externally further in on the sleeve and internally further out on the sleeve, as well as that an expandable, preferably elastic liquid-proof cover surrounds said sleeve from the outer portion thereof.

Upon attachment, the expansion sleeve termed as the bathroom expander or the expander plug is applied in a pre-drilled hole and mounting pliers are used in a known way for establishing a correct expansion in the most reliable way. Now, the expansion occurs simultaneously on two parts of the expander plug, on one hand at the back of the hole and the wall, and on the other hand inside the hole. The expansion in the hole is a result of the expander being cut and that there is a cast protrusion inside the front part of the bathroom expander. The mounting tool is placed between the head of the screw and the washer. Pressure is applied in order to get the rear part of the bathroom expander to move toward the mouth of the hole. The effect becomes that also the internal cylinder is pushed forward and presses the cast protrusions against the edges of the pre-drilled hole and the front part expands. The front expansion is regulated by adapting the heights of the cast protrusions in the manufacturing. The bathroom expander has also an expandable metallic or an elastic polymeric covering that follows the expansion and together with suitable compound, for instance Racofix® or silicone®, seals the hole in a liquid-proof way. It is the front expansion inside the hole that allows the waterproof layer to become restored.

Figure 7:
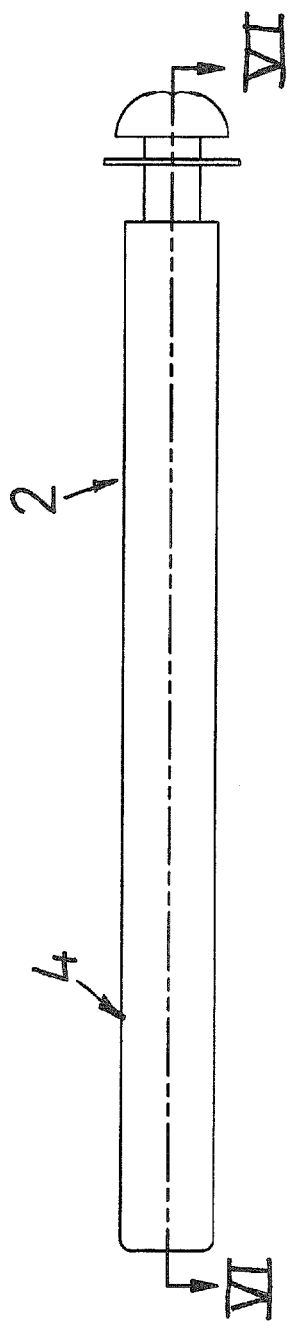
Figure 8:
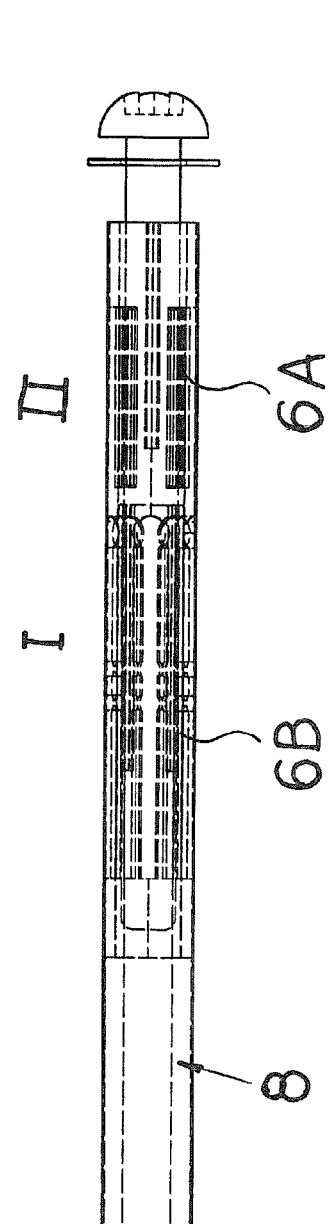
Figure 14:
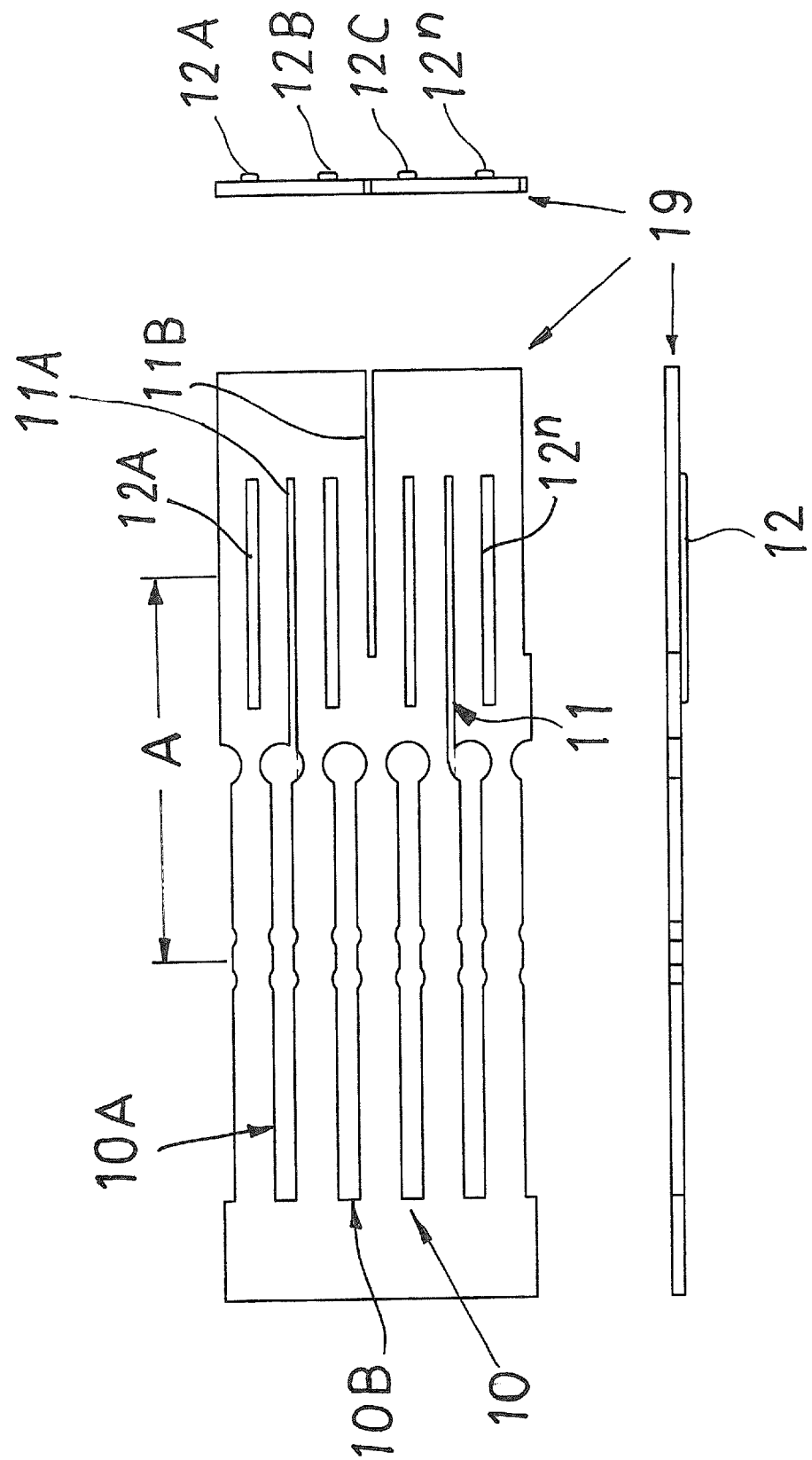
Figure 15:
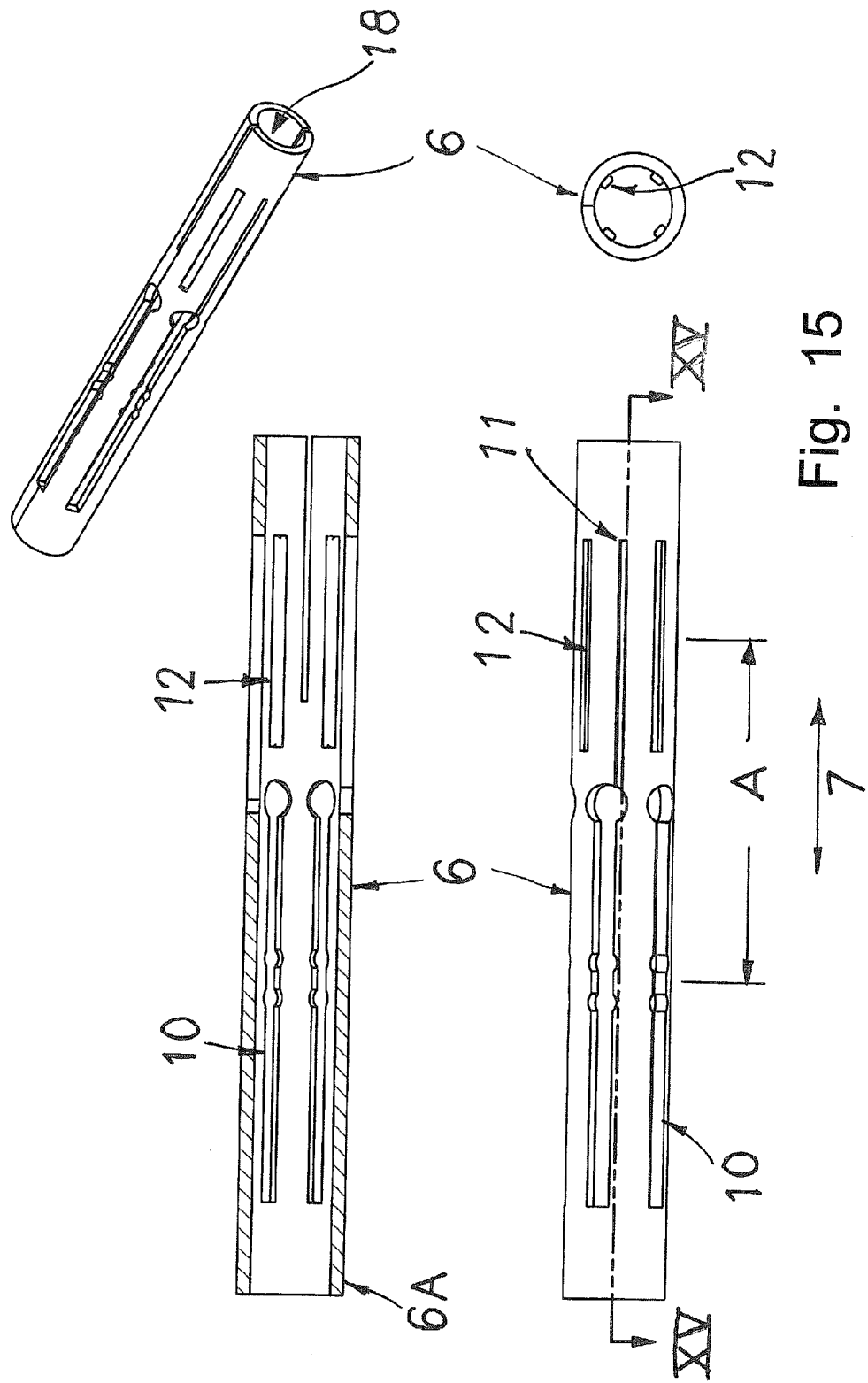
Figure 16:
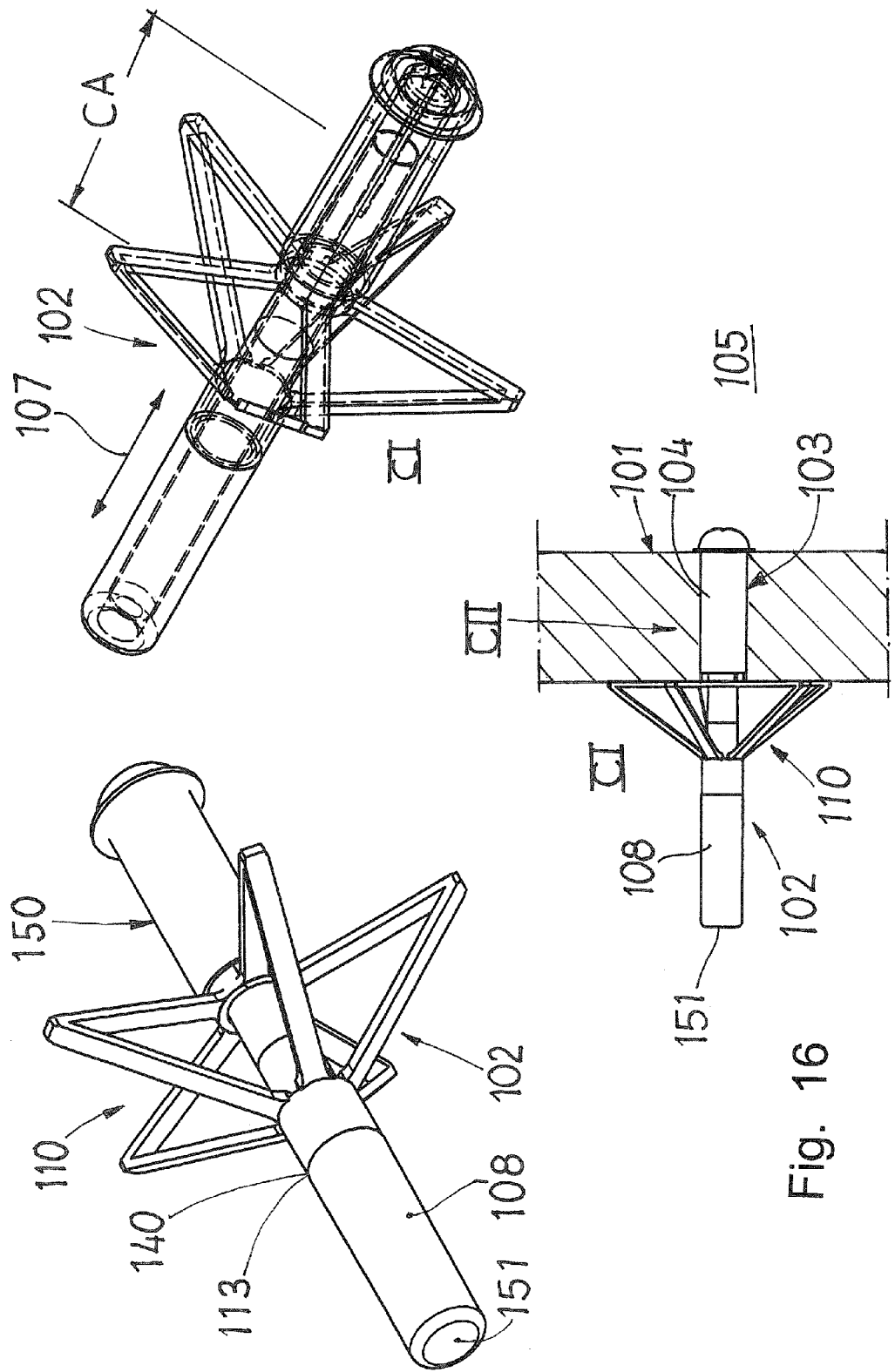
Figure 17:
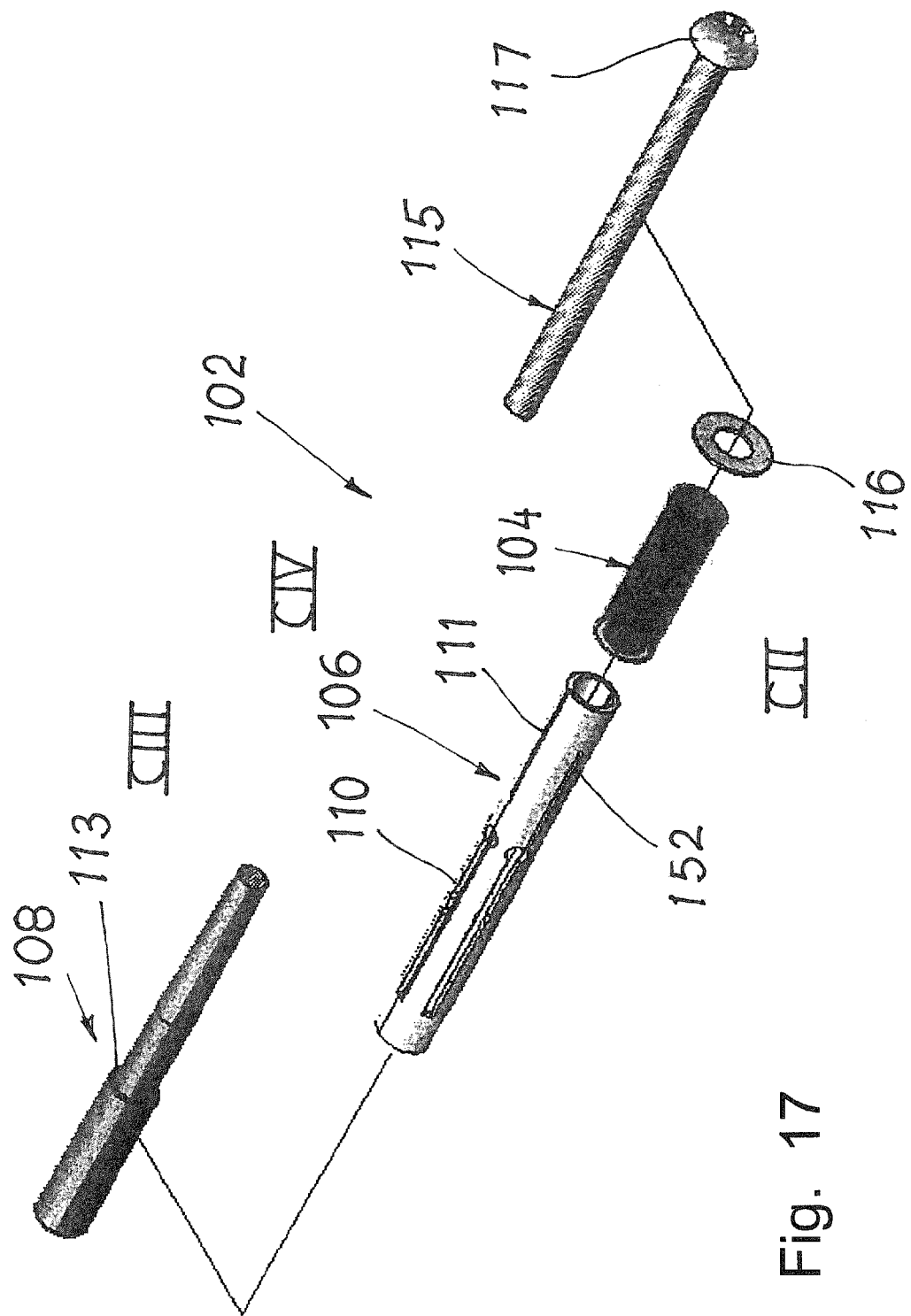
Figure 21:
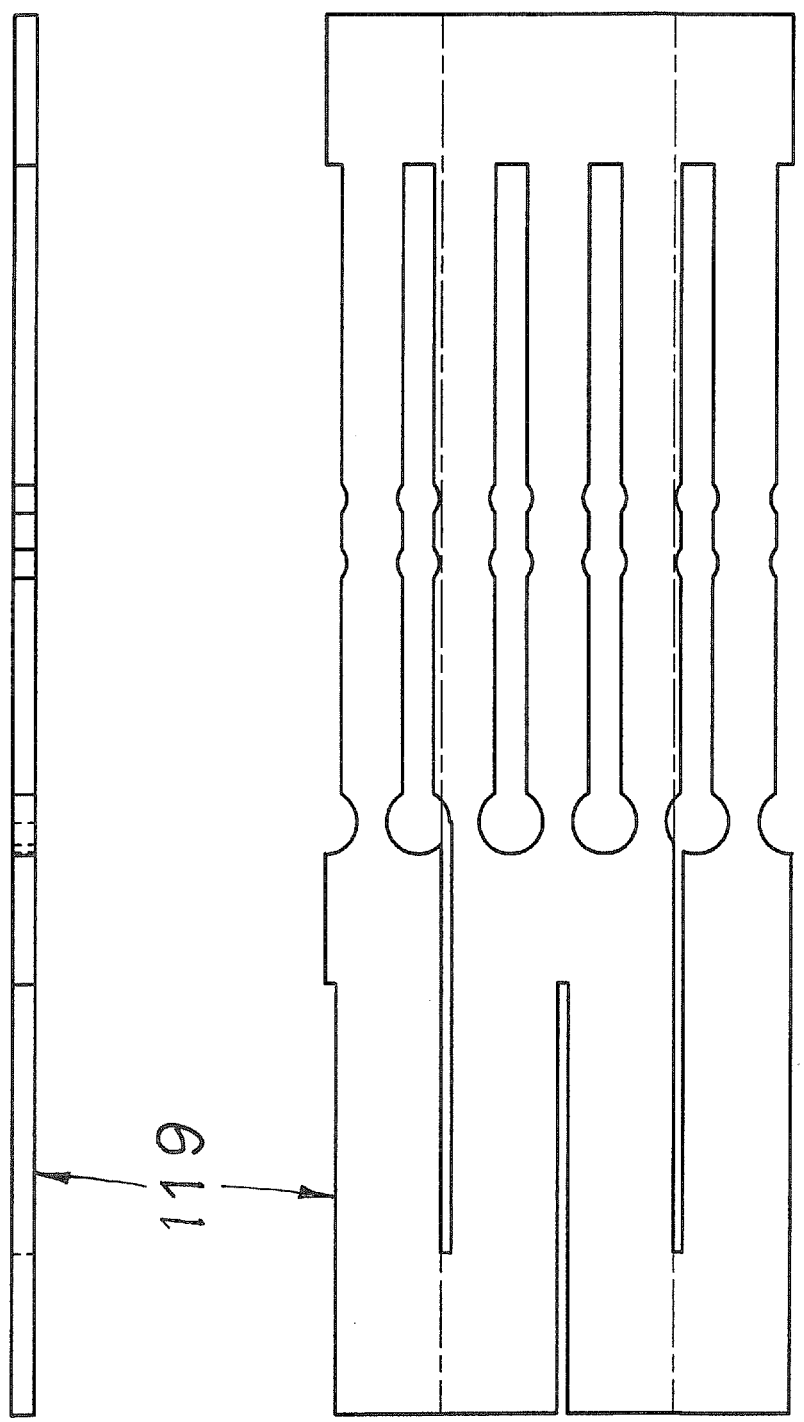
Figure 22:
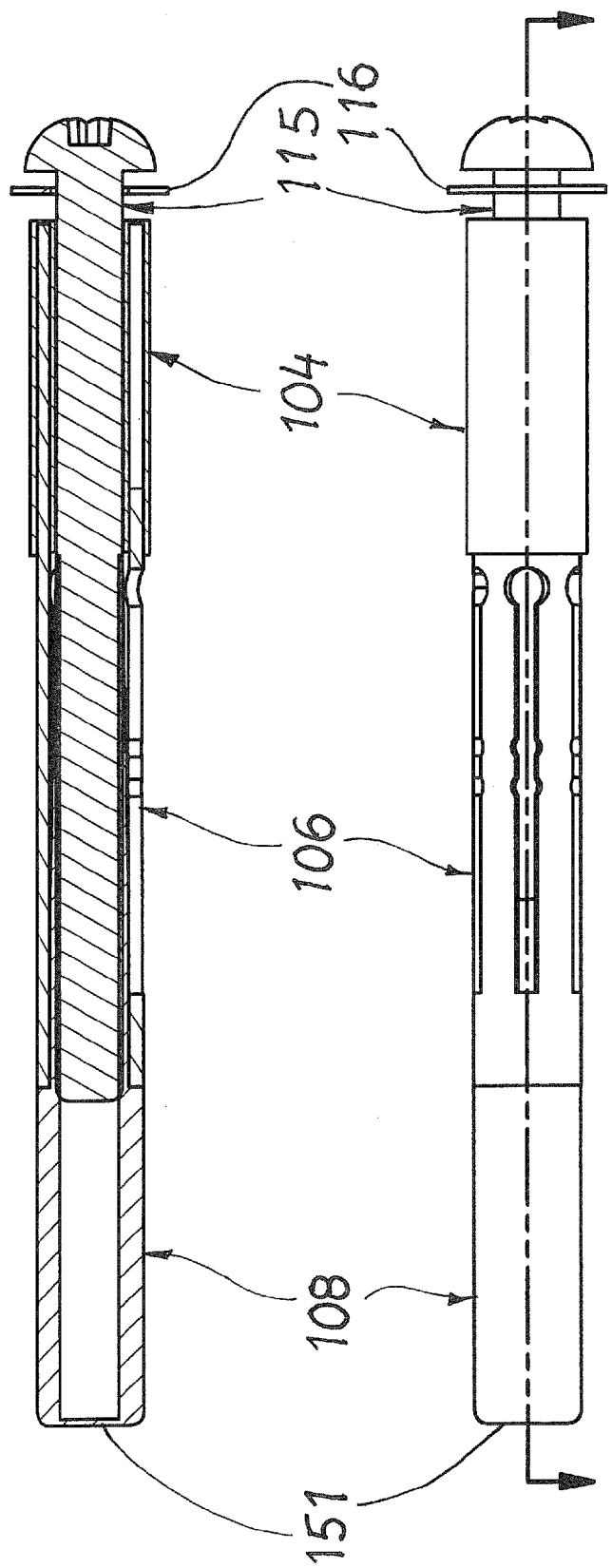
Figure 23:
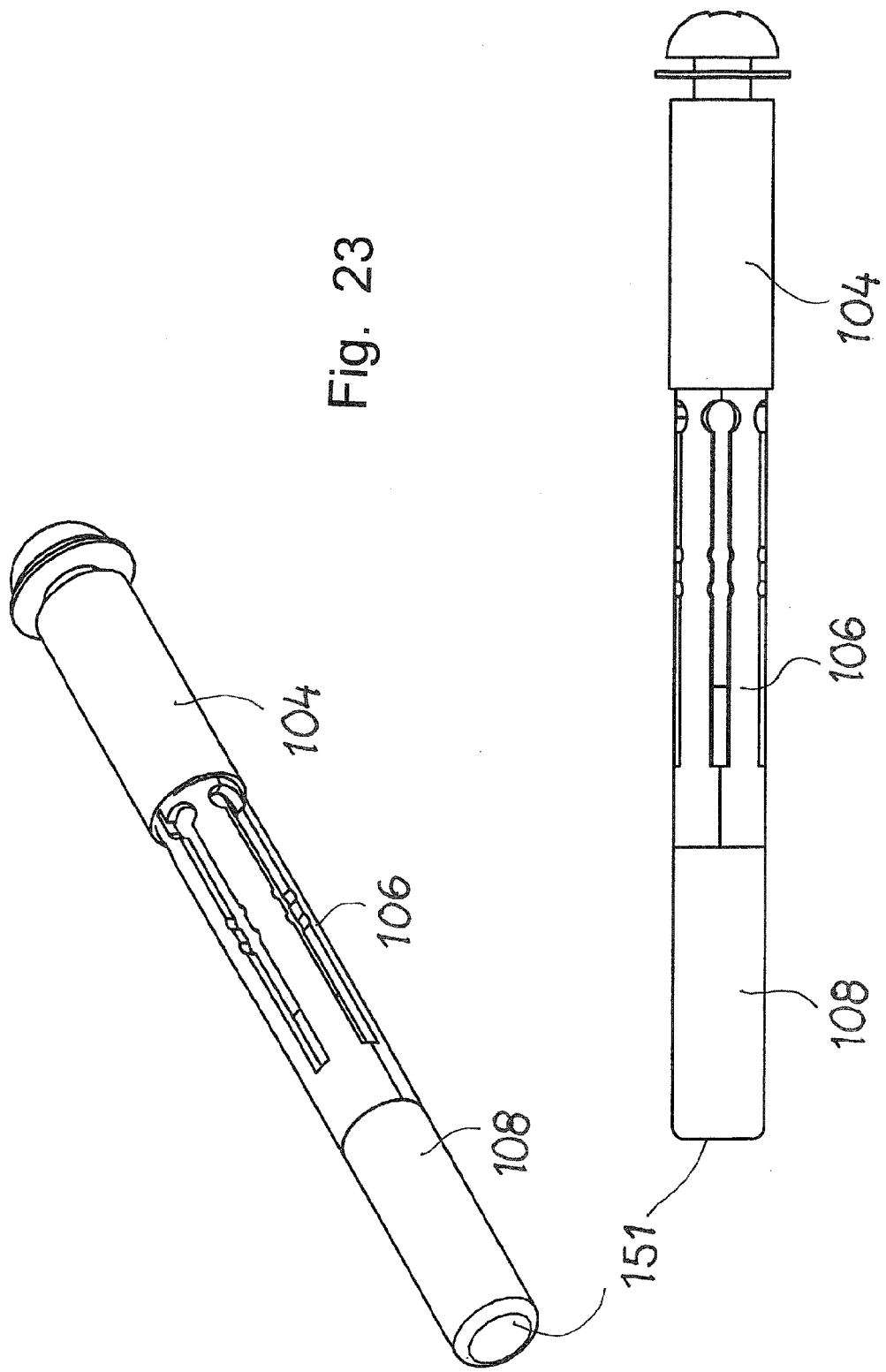

In the following, the invention is described in the form of a number of preferred embodiment examples, reference being made to the drawings, in which FIGS. 1-15 show a first embodiment example, wherein FIG. 1 shows in perspective and schematically an expanded mounting element, FIG. 2 shows the mounting element as seen from the side, FIG. 3 shows a section along the line III-III in FIG. 2, FIGS. 4 and 5 show cross-sections of a mounting element and the appurtenant wall, FIG. 6 shows a section view along the line VI-VI in FIG. 7 of a mounting element, FIG. 7 shows a side view of a mounting element, FIGS. 8-9 show a side view of a mounting element, FIG. 10 shows a section view along the line X-X in FIG. 9, FIG. 11 shows an exploded view of a mounting element according to the invention, FIG. 12 shows an exploded view of a liquid-proof cover, FIG. 13 shows in perspective side view the respective sections along the line XIII-XIII of a push rod, FIG. 14 shows different views of a sheet-metal plate forming an expansion sleeve, and FIG. 15 shows a said expansion sleeve in perspective, in side view, in end view and in section view, respectively, along the line XV-XV, while FIGS. 16-23 show a second embodiment example of a liquid-proof mounting element, wherein FIG. 16 shows the mounting element in the expanding state, as seen from different directions, FIG. 17 shows an exploded view of said embodiment example of mounting elements, FIG. 18 shows an expansion sleeve included in the mounting element in perspective view and side view, respectively, FIG. 19 shows a side view and cross-section, respectively, of the mounting element, FIG. 20 shows in section view the encircled portion shown in FIG. 19 of a mounting element, FIG. 21 shows different views of a piece of material intended to form an expansion sleeve in question, FIG. 22 shows in section view and side view, respectively, a said mounting element, and FIG. 23 shows in perspective and side view, respectively, said mounting element.

According to a first embodiment of the present invention, a proceeding according to the present invention refers to, in connection with hole making in a wall 1, for the mounting of items, e.g., sanitary equipment, cupboards, towel rails, mirrors and other necessary items, that are desired to be placed in bathrooms and other suitable wet areas on the moisture-proof walls 1 in question by means of an expandable mounting element 2, the provision of efficient sealing of the hole 3 in question for the mounting element 2 in a reliable and efficient way. Said proceeding involves that, in addition to providing an expansion I of the mounting element 2 behind said wall 1, there is also provided an internal expansion II of the mounting element 2 in the receiving hole 3 of the mounting element 2 in question in the wall 1, as well as there is furthermore provided a liquid-proof III cover 4 around the entire mounting element 2 in question introduced and expanding in said receiving hole 3.

According to the invention, it is furthermore possible to allow an applied expandable compound (not shown) surround the liquid-proof III cover 4 and seal the hole 3.

A said indicated proceeding is both simple and efficient in terms of structure as well as use.

Means for carrying out an indicated proceeding for, in connection with hole making in a wall 1, for the mounting of items on the moisture-proof walls 1 of a wet area 5 by means of an expandable mounting element 2, providing sealing of the hole 3 according to the above mentioned involves that an expansion sleeve 6 has the ability to expand I; II at a mutual distance A from each other, as seen along the length extension 7 of the sleeve. Said expansion I; II is arranged to occur externally on the sleeve further in on the sleeve 6 as seen in the direction from the rear end 6A of the sleeve and internally further out on the sleeve 6, as well as that a metallic expandable or an elastic liquid-proof cover 4 surrounds said sleeve 6 and a pressure part 8 connectable thereto in the direction from the outer rear portion 6A thereof and around the circumference of the entire sleeve as well as in a liquid-proof way around the front inner face portion 6B thereof and around the face portion of the pressure part 8.

Preferably, said cover 4 consists of latex rubber, plastic or another similar expandable and air- and liquid-proof material. In the case of a metallic expandable cover 4, said metal is formed of aluminum that has good liquid-proofing capacity.

Internally in the expansion sleeve 6, a sleeve-shaped said pressure part 8 closed in the inner end 8A is receivable and that is provided with internal threads 9. Said pressure part 8 is attached to the expansion sleeve 6, for instance by welding, agglutination, etc., at the area of the shoulder 32 of the pressure part and the end 33 of the sleeve 6 when the parts 6, 8 are assembled. On said sleeve 6, separated groups 10, 11 having expandable parts 10A, 10B . . . ; 11A, 11B . . . are situated, and preferably said expandable parts 10A . . . ; 11A . . . are formed of perforations in the cover of the sleeve 6.

Internally in the sleeve 6, at the area of the rear group 11 of perforations, a thickened portion 12 of the sleeve 6 is arranged, preferably in the form of parallel pads 12A, 12B, 12C, . . . 12n situated at a mutual distance from each other, as seen along the circumference of the sleeve.

Said pressure part 8 has, at one end 8B thereof, a rear stop part 13 at an area 14 of a thinner portion of the pressure part 8, and which stop part 13 is arranged to co-operate with the front end portion 6B of the sleeve for the provision of expansion of front expandable parts as well as rear expandable parts when distancing the screw 15 received therein and the sleeve 6 in its longitudinal direction by means of mounting pliers in a known way.

Around the circumference of said pressure part 8, a number of chamfers 30 are arranged, extending in the length extension 31 of the pressure part 8. Said chamfers 30 are arranged to strengthen the expander 6 so that it is not urged to be turned without expansion occurring in the desired direction and in the correct way.

Said elastic liquid-proof cover 4, which is arranged to surround both the sleeve 6 and the pressure part 8, may be formed of a sleeve-shaped rubber or plastic bag, and this is arranged to be threaded onto the sleeve 6 and the pressure part 8 before the same are introduced into the drill hole 3 in the direction from the wet area 5 in question as a joint unit. The cover may alternatively be formed of a liquid-proof metallic cover that is expandable. For instance, the cover may consist of aluminium that may be in the form of a corrugated liquid-proof cover that can expand into the desired shape.

Internally in the expansion sleeve 6, a said screw 15 is arranged to be screwed in and received therein to the major part for carrying the intended attachment item. A reaction washer 16 is threaded on said screw 15 inside the screw head 17, and between which mounting pliers are arranged to act upon tightening and expansion of the front expandable portion 10 of the expander by means of the mounting pliers in a known way after the screwing-in of screws 15 into the mounting element, in threads 9 at the rear end 8B of the pressure part 8, which is introduced with the tapering part 14 thereof into the internal reception space 18 of the mounting element 2.

The part of the mounting element 2 manufactured and formed of metal as an expansion sleeve 6 is preferably made from a flat sheet of plastic or sheet-metal plate 19 that is provided with a number of longitudinal parallel through perforations 11 as well as internal pads 12A, 12B in the wall of the convolutable sheet 19. Special threads are not needed now on said sleeve 6, but the threads 9 are instead arranged in the pressure part 8, which is unturnably attached to the sleeve 6.

The embodiment of the invention that is shown as a second example in the drawings in FIGS. 16-23 differs from the embodiment described above foremost by the expansion as well as by the liquid-proof cover of the mounting element.

Accordingly, a method, in connection with hole making in a wall 101, for the mounting of items on the moisture-proof walls 101 of a wet area by means of an expandable mounting element 102, provides sealing of the hole 103. Besides providing an expansion CI of the mounting element 102 behind said wall 101, there is also provided an internal expansion CII of the mounting element 102 in the receiving hole 103 of the mounting element 102 in the wall 101. There is furthermore provided a liquid-proofing CIII around the mounting element 102 introduced and expanding in said receiving hole.

Said internal expansion CII as well as the liquid-proofing CIII in the receiving hole 103 are provided by means of a common element in the form of an elastic cover 150.

For further increasing the reliability against moisture damage, it is furthermore possible to allow applying an expandable compound to surround the liquid-proof CIII cover 150 and seal the hole 103.

Means for carrying out an additional proceeding, according to what has been mentioned above, for, in connection with hole making in a wall 101, for the mounting of items on the moisture-proof walls 101 of a wet area 105 by means of an expandable mounting element 102, providing sealing of the hole 103 comprises an expansion sleeve 106 that has the ability to expand CI, CII at a distance CA from each other, as seen along the length extension 107 of the sleeve. The expansion CI; CII is arranged to occur externally further in on the sleeve 106 inside the wall 103 and to occur internally further out on the sleeve 106 within the wall 103. An expandable, preferably elastic liquid-proof cover 104 is received on the outer portion of said sleeve 106 and the function of which will be described below.

Internally in the expansion sleeve 106, at least a portion of a sleeve-shaped pressure part 108 that is closed at one end 151 and has internal threads 109 is receivable. Perforation groups 110, 111 having expandable perforations 110; 104 are situated on said sleeve 106 at a mutual distance CA from each other, as seen along the length extension 107 of the sleeve 106, said front expandable perforation group 110 being formed of perforations of the cover of the sleeve 106.

Said pressure part 108 has a stop part 113 that is arranged to co-operate with the front end portion 140 of the sleeve for the provision of expansion of front expandable parts as well as rear expandable parts when distancing the screw received therein and the sleeve in its longitudinal direction by means of mounting pliers. Said expandable, sleeve-shaped elastic liquid-proof cover 104, which is double-walled 153, 154 with a qap 152 therebetween and sealed 155 at one end 104A thereof, is arranged to surround part of the sleeve 106, both internally in and externally of the same, and is formed of a sleeve-shaped cover 104 that consists of rubber, plastic, aluminium or another elastic and liquid-proof material.

A screw 115 screwable internally into the expansion sleeve 106 carries a reaction washer 116 inside the screw head 117 thereof.

Said expansion sleeve 106 is preferably made from a sheet 119 of sheet-metal plate or plastic having longitudinal parallel through perforations 110, 111 in the convolutable sheet 119, or may be produced in another suitable way.

The circumference of said pressure part 8 is identical to the circumference of the end co-operatable portion 156 of the expansion sleeve 106.

The nature and function of the invention should have been clear from what has been described above and shown in the drawings, and the invention is naturally not limited to the embodiments described above and shown in the accompanying drawings. Modifications are feasible, particularly as for the nature of the different parts, or by using an equivalent technique, without departing from the protection area of the invention, such as it is defined in the claims.

The invention claimed is:

1. A method of mounting an item on a moisture-proof wall of a wet area by a mounting element that seals a receiving hole in the wall, comprising:
   expanding the mounting element behind the wall, wherein the mounting element includes an expandable sleeve having portions able to expand at a distance from each other along a length of the expandable sleeve and receiving internally at least a portion of a sleeve-shaped pressure part having a closed end and internal threads, and a screw that is screwable internally into the expandable sleeve and carries a reaction washer in a head of the screw,
   internally expanding the mounting element in the receiving hole, expansion occurring externally further in on the sleeve inside the wall and occurring internally further out on the sleeve in the wall in response to lengthening of the screw and the expandable sleeve in a longitudinal direction, and
   providing a liquid-proofing around the mounting element introduced into and internally expanded in the receiving hole.

2. The method of claim 1, wherein internal expansion of the mounting element and liquid-proofing are provided by an elastic cover on an outer portion of the expandable sleeve.

3. The method of claim 2, further comprising applying an expandable compound that surrounds the elastic cover and seals the hole.

4. An apparatus for mounting an item on a moisture-proof wall of a wet area, comprising:
   an expandable mounting element configured for sealing a receiving hole in the wall, wherein the expandable mounting element includes an expandable sleeve having portions able to expand at a distance from each other along a length of the sleeve, and expansion is arranged to occur externally further in on the sleeve inside the wall and to occur internally further out on the sleeve in the wall, and
   an elastic liquid-proof cover on an outer portion of the sleeve, and
   a screw that is screwable internally into the expandable sleeve and that carries a reaction washer in a head of the screw,
   wherein the sleeve is configured to receive internally at least a portion of a sleeve-shaped pressure part having a closed end and internal threads; the sleeve is formed from a sheet of metal or plastic having longitudinal parallel perforations; the portions able to expand at a distance from each other along a length of the sleeve include a front portion that includes perforations of the cover; and the pressure part includes a stop part configured to cooperate with a front end portion of the sleeve for expanding the portions able to expand when the screw received in the sleeve and the sleeve are lengthened in a longitudinal direction, thereby expanding the mounting element behind the wall and in the receiving hole and providing liquid-proofing around the mounting element.

5. The apparatus of claim 4, wherein the elastic liquid-proof cover is double-walled and sealed at one end, is arranged to surround part of the sleeve both internally in and externally of the sleeve, and is sleeve-shaped of rubber, plastic, or aluminum.

6. The apparatus of claim 4, wherein a circumference of the pressure part is substantially identical to a circumference of a cooperating end portion of the expandable sleeve.

* * * * *